United States Patent Office 2,931,782
Patented Apr. 5, 1960

2,931,782
PROCESS FOR SURFACE COATING POLYMER PARTICLES IN A VINYL CHLORIDE POLYMER LATEX WITH AN ALDEHYDE RESIN AND PRODUCT OBTAINED THEREBY

Kenneth Barry Jarrett, Welwyn, England, assignor to Imperial Chemical Industries Limited, London, England, a corporation of Great Britain No Drawing. Application December 9, 1957
Serial No. 701,344

Claims priority, application Great Britain
December 20, 1956

13 Claims. (Cl. 260—29.3)

This invention relates to improvements in synthetic materials.

It is an object of the present invention to provide synthetic materials which are useful as reinforcing fillers for natural and synthetic polymers, including natural and synthetic rubbers. Other objects will appear hereinafter.

According to one aspect of the present invention I provide a process which comprises adding to an aqueous polymer latex made by the emulsion polymerisation of vinyl chloride at least one water-soluble aldehyde and at least one water-soluble compound which is capable of forming thermoset resins therewith, and reacting the aldehyde and the aldehyde-reactable compound to form a coating of an insoluble resin on the surfaces of the polymer particles in the latex. In a modification of this process, at least one water-soluble condensation product of an aldehyde and an aldehyde-reactable compound is introduced into said latex and reacted to form a coating of an insoluble resin on the surfaces of the polymer particles in the latex. My invention also comprises latices made by the above process, coated polymer particles produced by removing water from said latices and particularly mixtures of said latices with latices of natural and/or synthetic polymers (including natural and/or synthetic rubber) and polymer mixes derived therefrom.

In the preferred embodiment of my invention, the polymer particles which are coated with thermoset resin are particles of vinyl chloride homopolymer because of its cheapness and availability and the excellent results obtained therewith. Copolymers of vinyl chloride which are essentially vinyl chloride polymers, e.g. with a small amount, such as up to 30% by weight of vinyl chloride, of another mono-ethylenically unsaturated monomer, e.g. vinyl acetate or vinylidene chloride, may however be used.

Examples of aldehyde-reactable compounds which may be used are phenols such as monohydroxybenzene, the cresols or xylenols (e.g. cresol and xylenol mixtures rendered active by their content of isomer with the hydroxyl group in the meta position) resorcinol and naturally occurring phenols such as a phlobatannin, e.g. quebracho tannin; urea, thiourea, or an aminotriazine, such as melamine. Mixtures of such compounds may be used. Combinations of formaldehyde and resorcinol or a similar polyhydric phenol are particularly suitable because of their solubility in water and the ease with which they can be converted into water-insoluble coatings. Melamine-formaldehyde resins are normally preferred when a light-coloured composition is required.

It will be appreciated that the reaction conditions which favour the production of insoluble resins from aldehydes and aldehyde-reactable compounds are dependent on the nature of the reactants. Thus, it is preferred when the latex is treated with formaldehyde and resorcinol to apply moderate heating to the treated latex at an alkaline pH which may be readily obtained by the addition of a small amount of ammonia. If the reactants are melamine and formaldehyde, convenient conditions are moderate heating at a neutral or alkaline pH. It is, of course, necessary that the polymer latex is stabilised against coagulation during the reaction between the aldehyde and aldehyde-reactable compound by a stabiliser which is effective under the particular pH conditions at which the reaction is carried out. When the reactants used are resorcinol and formaldehyde, the emulsion stabiliser used in the production of the polymer latex by emulsion polymerisation is normally sufficient for this purpose. Further quantities of stabiliser are, however, normally added when the reactants are melamine and formaldehyde.

I have found that when the coated polymer particles of my invention are incorporated in natural and synthetic polymeric materials they effect an improvement in certain important physical properties of said polymeric materials. Examples of polymeric materials which may be reinforced in accordance with this invention include natural and synthetic rubbers, such as polymers and copolymers of conjugated dienes, for example, butadiene-acrylonitrile rubbers, rubbery butadiene-methyl methacrylate copolymers, vinyl polymers such as polyvinyl chloride, and mixtures thereof. In order to obtain as intimate and uniform a dispersion as possible, we prefer that the coated polymer particles are incorporated in said polymeric materials by latex blending. In this process a latex of said polymeric material is mixed with a latex prepared in accordance with the present invention. Water may be removed by co-agulating and drying the mixed particles. When the polymer material being reinforced is polyvinyl chloride I have found that this may be conveniently done by spray-drying the mixed latices.

The amount of aldehyde and aldehyde-reactable compound (or of condensation product thereof) used in the production of the thermoset resin coating that is required to effect the objects of this invention is normally sufficient to form at least 1 part by weight of thermoset resin per 100 parts by weight of coated polymer particles and this amount should be insufficient to cause coagulation of the polymer particles of the latex. As the proportion of thermoset resin coating is increased, the coated polymer particles or compositions containing them become difficult to process by operations such as milling and calendering. It has been found that suitable proportions of thermoset resin coatings comprise a few parts, normally less than 25 parts by weight per 100 parts by weight of coated polymer particles. The optimum proportion depends on the particular resin used and can readily be determined by experiment.

I have found that especially good improvements in the tensile and other properties of rubbers, particularly synthetic rubbers, e.g. butadiene-acrylonitrile rubbery copolymers, are obtained by intimately mixing therewith resorcinol-formaldehyde resin-coated polymer particles of the present invention in proportions such that there are present between 2 and 7 parts by weight of said resin per 100 parts by weight of the mixture, the quantity of vinyl chloride polymer forming the core of the particles being of secondary importance.

I have also found that useful improvements in the impact strength of polyvinyl chloride are obtainable by means of the present invention. Thus, improvements in the impact strength of polyvinyl chloride may be achieved by intimately mixing therewith resorcinol-formaldehyde resin-coated polymer particles of the present invention in proportions such that there are present between 0.2 and 7 parts by weight of said resin per 100 parts by weight of the mixture, the quantity of vinyl chloride polymer forming the core of the particles being of secondary importance. Furthermore, I have found that the particles of the present invention containing up to 7 parts by weight of the resorcinol-formaldehyde resin per 100 parts by weight of the coated particles may be shaped by such processes as rolling or calendering. Thus, coated polymer particles of the present invention in which the resorcinol-formaldehyde resin content lies between 1 and 7 parts by weight per 100 parts by weight of the coated particles constitute vinyl chloride polymer compositions of improved impact strength.

When using melamine-formaldehyde resin as the thermoset resin component of our coated particles, the impact strength of polyvinyl chloride is particularly improved by intimately mixing uncoated polyvinyl chloride particles with melamine-formaldehyde resin-coated polymer particles of the present invention in proportions such that there are present between 1 and 4 parts by weight of said resin per 100 parts by weight of the mixture. I prefer to use less than 40 parts by weight of said melamine-formaldehyde resin-coated particles per 100 parts of the combined weight of coated and uncoated particles, as slightly greater proportions of coated particles effect only an insignificant increase in the impact strength of polyvinyl chloride and considerably greater proportions may even reduce it.

The coated polymer particles of this invention are adapted to conversion into shaped articles under the action of heat and pressure. Thus, compositions based on my coated polymer particles may be used in granular or sheet form. Granules are suitable for injection and compression moulding and can be obtained by converting the composition into the form of thin sheets and then cutting the sheets. Sheets of any desired thickness can be produced from the compositions of our invention by, e.g. rolling followed by a press-polishing operation. Moulded shapes can be obtained from flat sheets by heating the sheets and drawing or pressing them against a former.

The compositions of my invention have good chemical and heat resistance, good electrical properties and good external weathering properties. They may be used in a large variety of applications where these properties, in addition to their toughness, hardness and good resistance to impact are required.

Ancillary ingredients such as plasticisers, stabilisers, pigments etc. may also be present in the compositions of my invention.

My invention is illustrated but in no way limited by the following examples in which all parts given are by weight.

EXAMPLES 1 TO 4

A latex according to my invention was prepared in the following manner. To 3,600 parts of a polyvinyl chloride latex, of 45% solids content, obtained by the emulsion polymerisation of vinyl chloride using ammonium persulphate as catalyst and the sodium salt of a highly sulphonated methyl oleate as emulsion stabiliser, there was added a solution of 146 parts of resorcinol in 9,000 parts of distilled water. The mixture was heated to 60° C. with constant stirring and a mixture of 281 parts of 36% formaldehyde solution and 89 parts of .88 ammonia with 1,000 parts of distilled water was then added. The temperature was then raised to 80° C. over a period of 2 hours and maintained at that temperature for 15 hours with constant stirring.

The resulting latex was mixed, with constant stirring, with a latex obtained by the emulsion copolymerisation of a mixture of 67.2 parts of butadiene and 32.8 parts of acrylonitrile, the relative amounts of the two latices used being such that there were present 20 parts of coated polymer particles per 100 parts of copolymer solids. The latex blend was coagulated by adding it to a ½ percent solution of aluminium sulphate hydrate.

$$(Al_2(SO_4)_3 \cdot 18H_2O)$$

and the resulting coagulum was washed, dried and compounded on a conventional rubber mill to yield a composition having the following constitution:

| | Parts |
|---|---|
| Resorcinol-formaldehyde treated polyvinyl chloride | 20 |
| Butadiene-acrylonitrile copolymer | 100 |
| Zinc oxide | 3 |
| Stearic acid | ½ |
| Sulphur | 1½ |
| Dibenzthiazyldisulphide | 1 |

Similar compositions were made from mixed latices prepared as above containing 40, 60 and 80 parts respectively of resorcinol-formaldehyde treated polyvinyl chloride per 100 parts of butadiene-acrylonitrile copolymer. Each of these compositions was cured at 153° C. and the physical properties of the cured compositions are set out in Table I. For comparison purposes only, the properties of cured butadiene-acrylonitrile rubbers filled with known reinforcing fillers in place of the resorcinol-formaldehyde treated polymers are also given.

The resilience of all the specimens was measured using a Dunlop Tripsometer and the hardness measurements were carried out in accordance with British Standard Specification 903, Part 19 (1950).

*Table 1*

| Example No. | Reinforcing Filler (R.F.) | Parts of R.F. per 100 pts. nitrile rubber | Curing time at 153° C. (Mins.) | Tensile Strength (lb./sq. in.) | Elongation at break, percent | 100% Modulus, lb./sq. in. | 300% Modulus, lb./sq. in. | Resilience, percent | Hardness, B.S. * |
|---|---|---|---|---|---|---|---|---|---|
| 1 | Resorcinol formaldehyde treated p.v.c. | 20 | 35 | 2,255 | 795 | 170 | 260 | 51.2 | 56 |
| 2 | ----do---- | 40 | 35 | 2,540 | 835 | 180 | 340 | 45.2 | 59.5 |
| 3 | ----do---- | 60 | 35 | 2,380 | 625 | 220 | 680 | 38.6 | 65.5 |
| 4 | ----do---- | 80 | 20 | 2,620 | 325 | 400 | 1,350 | 32.2 | 73.5 |
|   | High abrasion furnace black | 30 | 20 | 2,780 | 740 | 210 | 640 | 49.4 | 58 |
|   | Finely divided silica | 30 | 50 | 1,600 | 940 | 150 | 200 | 49.2 | 50 |
|   | High styrene-low butadiene copolymer containing 85+ styrene. | 30 | 35 | 1,190 | 740 | 320 | 625 | 45.5 | 73 |

EXAMPLES 5 TO 11

Further batches of latex comprising resorcinol-formaldehyde treated polyvinyl chloride were prepared by the method described in the previous examples. Each batch was mixed, with stirring, with an amount of an untreated polyvinyl chloride latex such that there were present in the mixed latices 5, 10, 20, 40, 60, 80 and 100 parts respectively of coated polymer particles per 100 parts of uncoated polyvinyl chloride particles. The mixed latices were spray-dried and the dried particles were milled on hot rolls with 2 parts of calcium stearate and 15 parts of titanium dioxide for every 100 parts of said dried blended particles, and the crepes thus formed calendered into thin foils. Several layers of foils were stacked one above the other and pressed between heated platens to form sheets, 1/16 inch thick.

The impact strengths of sheets prepared from mixes containing these amounts of resorcinol-formaldehyde treated polyvinyl chloride are given in Table II. For comparison purposes only, the impact strength of a sheet made by the above method from a similar mix but containing no resorcinol-formaldehyde resin-coated polymer is given. The impact strengths were determined using a pendulum type machine. The specimens used were tensile specimens of the shape given in British Standard Specification 903 (type A) but having a thickness of 1/16 inch. Each specimen was clamped at both ends in such a position that when the pendulum was allowed to fall freely, the specimen was struck at right angles to its major axis by the pendulum when the latter reached the lowest point of its path. The pendulum had a striking nose of radius 0.315 inch and its energy at impact with the specimen was 25 ft. lb. The energy of the pendulum remaining after breaking the specimen was measured (in ft. lb.) and subtracted from the energy of the pendulum at impact to give a measure of the impact strength of the specimen. A number of specimens from each sheet were tested and the figures quoted are average values.

Table II

| Example No. | Parts of resorcinol formaldehyde treated polymer per 100 pts. of untreated p.v.c. | Foil lamination temperature (° C.) | Impact strength (ft. lb.) |
| --- | --- | --- | --- |
| 5 | 5 | 168 | 10.1 |
| 6 | 10 | 168 | 10.5 |
| 7 | 20 | 168 | 11.5 |
| 8 | 40 | 168 | 14.9 |
| 9 | 60 | 168 | 15.3 |
| 10 | 80 | 168 | 11.6 |
| 11 | 100 | 168 | 12.7 |
| — | 0 | 155 | 8.9 |

EXAMPLES 12 TO 17

These examples show the effect of varying the weight of thermoset resin coating on the impact strength of compositions in which resorcinol-formaldehyde treated polyvinyl chloride is the sole polymeric constituent.

A series of latices comprising resorcinol-formaldehyde treated polyvinyl chloride were prepared by the method described in Examples 1 to 4, the proportion of thermoset resin coating on the coated polymer particles of each latex being different as shown in Table III. The latices were spray-dried and the dried polymers milled on hot rolls with 2 parts of calcium stearate and 15 parts of titanium dioxide for every 100 parts of polymer. The resulting crepes were calendered into thin foils and several layers of foils were stacked one above the other and pressed between heated platens to form sheets, 1/16 inch thick. The impact strengths of the sheets, determined by the method described in the preceding examples, are set out in Table III.

Table III

| Example No. | Parts of resorcinol-formaldehyde resin per 100 pts. of coated p.v.c. particles | Impact strength (ft. lb.) |
| --- | --- | --- |
| 12 | 1.2 | 9.0 |
| 13 | 2.2 | 12.0 |
| 14 | 3.7 | 10.1 |
| 15 | 4.9 | 12.0 |
| 16 | 5.8 | 10.0 |
| 17 | 6.5 | 12.0 |

EXAMPLES 18 TO 31

In Table IV impact strengths (measured by the above method) are given for a number of further compositions made into sheets as described above.

Table IV

| Example No. | Parts of resorcinol-formaldehyde resin coating on p.v.c. per 100 pts. of coated particles | Parts of coated particles per 100 pts. of coated and uncoated particles | Parts of resin per 100 pts. of coated and uncoated particles | Impact strength (ft. lb.) |
| --- | --- | --- | --- | --- |
| 18 | 2.2 | 16.7 | 0.4 | 9.0 |
| 19 | 4.9 | 16.7 | 0.8 | 10.1 |
| 20 | 6.5 | 16.7 | 1.1 | 9.5 |
| 21 | 1.0 | 30.0 | 0.3 | 10.4 |
| 22 | 1.0 | 50.0 | 0.5 | 11.6 |
| 23 | 1.0 | 75.0 | 0.75 | 12.3 |
| 24 | 2.0 | 30.0 | 0.6 | 10.4 |
| 25 | 2.0 | 50.0 | 1.0 | 11.1 |
| 26 | 2.0 | 75.0 | 1.5 | 11.0 |
| 27 | 4.0 | 30.0 | 1.2 | 10.1 |
| 28 | 4.0 | 50.0 | 2.0 | 12.6 |
| 29 | 4.0 | 75.0 | 3.0 | 10.8 |
| 30 | 4.0 | 100.0 | 4.0 | 12.8 |
| 31 | 8.0 | 50.0 | 4.0 | 10.4 |

EXAMPLES 32 AND 33

Table V illustrates the effect of using differing amounts of a melamine-formaldehyde resin coating in place of the resorcinol-formaldehyde resin coatings of the previous examples.

16,200 parts of a polyvinyl chloride latex similar to that used in previous examples were stirred with 24,000 parts of water in a 50 litre flask, the temperature was raised to 50° C. and 150 parts of the sodium salt of a highly sulphonated methyl oleate added. A mixture of 567 parts of melamine and 1,000 parts of 36% formaldehyde solution was then added at 60° C. The temperature was then raised to 80° C. and held at this value for about 15 hours. The particles of polyvinyl chloride in the latex were thus provided with a coating of a melamine-formaldehyde resin weighing approximately 11% of the weight of the coated polymer particles.

The resulting latex was mixed with another latex containing uncoated polyvinyl chloride particles, the two latices being mixed in proportions such that the solids content of the mixed latex included 20% by weight of coated polymer particles. The mixed latex was spray-dried and 100 parts of the dried composition mixed with 2 parts of calcium stearate and 15 parts of titanium dioxide and converted into sheets by procedures exactly similar to those described above for compositions based on resorcinol-formaldehyde treated polyvinyl chloride.

The above experiment was repeated using greater amounts of melamine and formaldehyde to obtain coated polymer particles having a resin coating weighing approximately 15% of their total weight, said coated polymer particles again comprising 20% by weight of the solids content of the mixed latices.

Table V compares the impact strengths of the resulting sheets (measured as in the previous examples) with that of a sheet made in a blank experiment in which an equal amount of untreated polyvinyl chloride replaced the coated polyvinyl chloride particles of these examples.

Table V

| Example No. | Parts of melamine-formaldehyde resin coating on p.v.c. per 100 pts. of coated particles | Parts of coated particles per 100 pts. of coated and uncoated particles | Parts of resin per 100 pts. of coated and uncoated particles | Impact Strength (ft. lb.) |
| --- | --- | --- | --- | --- |
| 32 | 11 | 20 | 2.3 | 10.6 |
| 33 | 15 | 20 | 3.0 | 10.9 |
| — | 0 | 0 | 0 | 6.9 |

I claim:

1. A process which comprises adding to an aqueous polymer latex made by the emulsion polymerisation of vinyl chloride with from 0 to 30% of its weight of a compound selected from the group consisting of vinyl acetate and vinylidene chloride, formaldehyde and at least one water-soluble compound which is capable of reacting and forming thermoset resins therewith, said compound being selected from the group consisting of phenols, urea, thiourea and aminotriazines, and reacting the formaldehyde and the formaldehyde-reactable compound to form a coating of an insoluble resin on the surfaces of the polymer particles, the amounts of formaldehyde and formaldehyde-reactable compound used being such that the weight of coating formed is from 1 to 25 parts by weight per 100 parts by weight of the coated particles.

2. A process which comprises adding to an aqueous polymer latex made by the emulsion polymerization of vinyl chloride with from 0 to 30% of its weight of a compound selected from the group consisting of vinyl acetate and vinylidene chloride, at least one water-soluble condensation product of formaldehyde and formaldehyde-reactable compound which is capable of reacting and forming thermoset resins therewith, said compound being selected from the group consisting of phenols, urea, thiourea and aminotriazines, and reacting said water-soluble condensation product to form a coating of an insoluble resin on the surfaces of the polymer particles in the latex, the amount of said water-soluble condensation product used being such that the weight of coating formed is from 1 to 25 parts by weight per 100 parts by weight of the coated particles.

3. A process according to claim 1 in which the resin coating comprises a resorcinol-formaldehyde resin.

4. A process according to claim 1 in which the resin coating comprises a melamine-formaldehyde resin.

5. Resin-coated vinyl chloride polymer particles prepared by a process according to claim 1.

6. A process in which the latex of resin-coated polymer particles according to claim 5 is mixed with a latex of a polymeric material selected from the group consisting of natural rubber, synthetic polymers of conjugated dienes and polyvinyl chloride and water is removed from the mixed latices.

7. A process according to claim 6 in which the latex of resin-coated polymer particles is mixed with a latex of a butadiene-acrylonitrile copolymer.

8. A process according to claim 7 in which the resin coating comprises between 2 and 7 parts by weight of resorcinol-formaldehyde resin per 100 parts of the combined weight of coated particles and butadiene-acrylonitrile copolymer.

9. A process in which the latex of resin-coated polymer particles according to claim 5 is mixed with a latex of uncoated polyvinyl chloride particles.

10. A process according to claim 9 in which the resin coating comprises between 0.2 and 7 parts by weight of resorcinol-formaldehyde resin per 100 parts of the combined weight of the coated particles and uncoated particles.

11. A process in which the water is removed from a latex of resin-coated polymer particles according to claim 3, characterised in that the resorcinol-formaldehyde coating on the particles is not greater than 7 parts by weight per 100 parts by weight of the coated polymer particles.

12. A process according to claim 9 in which the resin coating comprises between 1 and 4 parts by weight of melamine-formaldehyde resin per 100 parts of the combined weight of the coated particles and uncoated particles.

13. A process according to claim 12 in which the proportion of resin-coated particles comprises less than 40 parts by weight per 100 parts of the combined weight of the coated particles and uncoated particles.

No references cited.